United States Patent
Nakajima et al.

[19]

[11] Patent Number: 5,908,347
[45] Date of Patent: Jun. 1, 1999

[54] POLISHING SYSTEM FOR POLISHING WAFER

[75] Inventors: Makoto Nakajima; Yoshio Nakamura; Yasuhide Denda; Toshihisa Yanagisawa; Toshiaki Seki; Satoru Arakawa; Masahiro Takeuchi; Mitsue Ogawa; Masanori Fukushima, all of Nagano, Japan

[73] Assignee: Fujikoshi Kikai Kogyo Kabushiki Kaisha, Nagano-ken, Japan

[21] Appl. No.: 08/838,636

[22] Filed: Apr. 11, 1997

[30] Foreign Application Priority Data

Apr. 23, 1996 [JP] Japan .................................. 8-100800

[51] Int. Cl.[6] .................................................. B24B 49/00
[52] U.S. Cl. ................................... 451/5; 451/8; 451/41; 451/285; 451/287; 451/289
[58] Field of Search ................................... 451/5, 6, 8, 9, 451/10, 11, 41, 285, 287, 288, 289, 54, 336, 337, 460, 444

[56] References Cited

U.S. PATENT DOCUMENTS

| | | |
|---|---|---|
| 4,653,231 | 3/1987 | Cronkhite et al. . |
| 4,680,893 | 7/1987 | Cronkhite et al. ........................ 451/41 |
| 4,960,485 | 10/1990 | Ichinose et al. . |
| 5,605,487 | 2/1997 | Hileman et al. .......................... 451/41 |
| 5,616,063 | 4/1997 | Okumura et al. ........................ 451/285 |
| 5,653,622 | 8/1997 | Drill et al. .................................. 451/41 |
| 5,679,060 | 10/1997 | Leonard et al. ............................ 451/5 |

FOREIGN PATENT DOCUMENTS

| | | |
|---|---|---|
| 0547894 | 6/1993 | European Pat. Off. . |
| 0648575 | 4/1995 | European Pat. Off. . |
| 2518689 | 11/1976 | Germany . |
| 58223561 | 12/1983 | Japan . |
| 62249409 | 10/1987 | Japan . |
| 63207559 | 8/1988 | Japan . |
| 5318310 | 12/1993 | Japan . |
| 7122622 | 5/1995 | Japan . |
| 8148451 | 6/1996 | Japan . |

*Primary Examiner*—Eileen P. Morgan
*Attorney, Agent, or Firm*—Jordan and Hamburg

[57] ABSTRACT

In the polishing system of the present invention, a adhering unit adheres a wafer on a carrying plate using liquid. A polishing unit polishes the wafer using a polishing plate. A feeding unit conveys the carrying plate from the adhering unit to the polishing unit. A dismounting unit removes the wafer from the carrying plate. A first discharging unit conveys the carrying plate from the polishing unit to the dismounting unit. A cleaning unit cleans the vacant carrying plate. A second discharging unit conveys the carrying plate from the dismounting unit to the cleaning unit. A third discharging unit conveys the carrying plate from the cleaning unit to the adhering unit. The units are formed into a loop lines so that the carrying plate is circulated in the loop line and the wafers are polished therein.

11 Claims, 3 Drawing Sheets

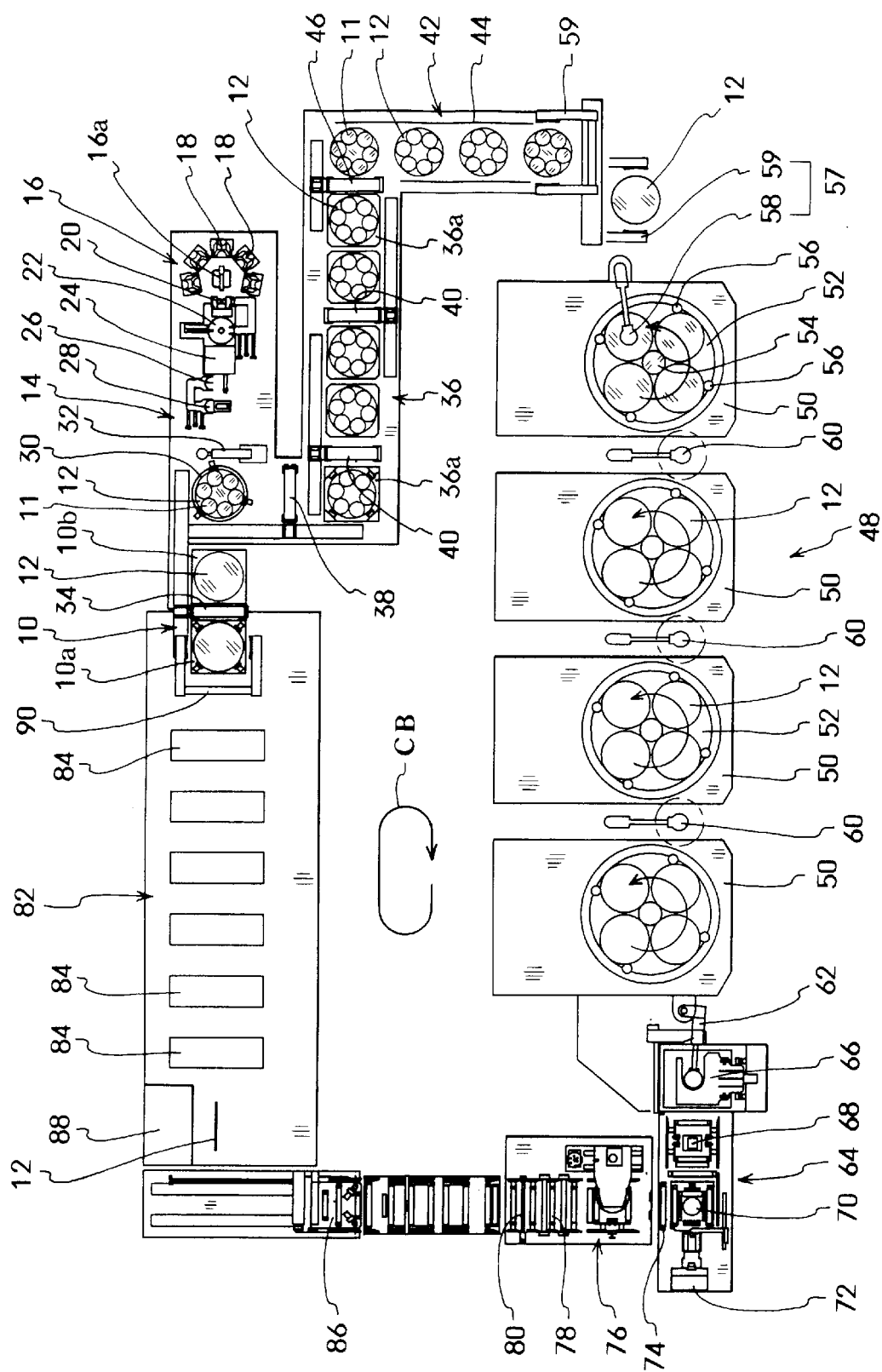

POLISHING SYSTEM FOR POLISHING WAFER

BACKGROUND OF THE INVENTION

The present invention relates to a polishing system for polishing wafers.

Conventionally, in the case of polishing surfaces of wafers, e.g., silicon wafers for semiconductor devices, the wafers have been polished by a plurality of independent machines: a sticking machine for sticking the wafers on a carrying plate; a polishing machine for polishing the wafers by pressing the carrying plate onto a polishing plate of the polishing machine and relatively moving the carrying plate with respect to the polishing plate; a peeling machine for peeling off the wafers, which have been polished, from the carrying plate; and a cleaning machine for cleaning the carrying plate from which the polished wafers have been peeled off.

Highly integrated semiconductor devices require silicon wafers which are polished with very high polishing accuracy. Such silicon wafers are made in clean rooms to remove particles in the air.

Further, large size silicon wafers are now required, so large size carrying plates are required. However, it is difficult to manually handle the large carrying plates.

Conventionally, the machines for polishing the wafers are independently installed, so the wafers are manually conveyed from one machine to another machine for each polishing step. Therefore, workers must work in the clean room for an extended time, so the degree of cleanliness of the clean room cannot be high. Furthermore accuracy of sticking the wafers on the carrying plates is also not high, so that the polishing accuracy is not high.

SUMMARY OF THE INVENTION

An object of the present invention is to provide a polishing system, which is capable of automatically polishing wafers and increasing the polishing accuracy thereof.

A first basic structure of the polishing system of the present invention comprises:
- a mounting unit adhering the wafer on a surface of a carrying plate, which is formed into a plate, by liquid;
- at least one polishing unit having a polishing plate, the polishing unit making the wafer, which has been adhered to on the carrying plate, contact the polishing plate and relatively moving the carrying plate with respect to the polishing plate to polish a surface of the wafer;
- a feeding unit discharging the carrying plate, on which the wafer has been stuck, from the mounting unit and feeding to the polishing unit;
- a dismounting unit for removing the wafer, which has been polished by the polishing unit, from the carrying plate;
- a first discharging unit discharging the carrying plate, on which the wafer has been adhered, from the polishing unit and conveying to the dismounting unit;
- a cleaning unit cleaning the carrying plate, from which the wafer has been dismounted;
- a second discharging unit discharging the carrying plate from the peeling unit and conveying to the cleaning unit; and
- a third discharging unit discharging the carrying plate from the cleaning unit and conveying to the mounting unit, wherein the units are arranged and connected to form into a loop line, so that the carrying plate is circulated in the loop line and a plurality of the wafers are polished.

In the polishing system, the mounting unit may include a pressing mechanism pressing the wafer onto the surface of the carrying plate so as to adhere the wafer thereon by the liquid.

In the polishing system, the pressing mechanism may be a roller unit having a press roller, which presses the wafer on the surface of the carrying plate and rolls to convey the carrying plate.

In the polishing system, the pressing mechanism may include.
- means for pressing the wafer on the surface of the carrying plate; and
- means for slightly rotating the wafer, which has been pressed by the pressing means.

The polishing system may further comprise:
- an identifying unit identifying data of the carrying plate;
- a first conveying unit discharging the carrying plate from the loop line when the identifying unit judges the carrying plate a wrong carrying plate; and
- a second conveying unit feeding the carrying plate to the loop line.

The polishing system may further comprise:
- a checking unit checking an external shape, including flatness, of the carrying plate;
- a discharging unit discharging the carrying plate when the checking unit judges the carrying plate a wrong carrying plate; and
- a supplying unit supplying a correct carrying plate to the loop line instead of the wrong carrying plate.

A second basic structure of the polishing system of the present invention comprises:
- a heating unit heating a carrying plate on which a wafer is adhered;
- an adhering unit adhering the wafer on a surface of the carrying plate, which has been heated by the heating unit, by an adhesive;
- a first carrying unit carrying the carrying plate from the heating unit to the adhering unit;
- a first cooling unit cooling the carrying plate, on which the wafer has been adhered, until reaching at or lower than soften temperature of the adhesive;
- a second carrying unit carrying the carrying plate, on which the wafer has been adhered, from the adhering unit to the first cooling unit;
- a second cooling unit cooling the carrying plate, on which the wafer has been adhered and which has been cooled by the first cooling unit, until reaching room temperature;
- a third carrying unit carrying the carrying plate, on which the wafer has been adhered, from the first cooling unit to the second cooling unit;
- at least one polishing unit having a polishing plate, the polishing unit making the wafer, which has been adhered on the carrying plate, contact the polishing plate and relatively moving the carrying plate with respect to the polishing plate to polish a surface of the wafer;
- a fourth carrying unit carrying the carrying plate, on which the wafer has been adhered, from the second cooling unit to the polishing unit;
- a dismounting unit for removing the wafer, which has been polished by the polishing unit, from carrying plate;

a fifth carrying unit carrying the carrying plate, on which the wafer has been adhered, from the polishing unit to the peeling unit;

a first cleaning unit cleaning the carrying plate, from which the wafer has been dismounted by the peeling unit, so as to remove the adhesive on the carrying plate;

a sixth carrying unit carrying the carrying plate from the dismounting unit to the first cleaning unit;

a second cleaning unit having a wash tub, the second cleaning unit further cleaning the carrying plate, which has been cleaned by the first cleaning unit, by sinking in the wash tub;

a seventh carrying unit carrying the carrying plate from the first cleaning unit to the second cleaning unit; and an eighth carrying unit carrying the carrying plate from the second cleaning unit to the heating unit, wherein the units are arranged and connected to form into a loop line, so that the carrying plate is circulated in the loop line and a plurality of the wafers are polished.

The polishing system may further comprises a stock section being provided between the first cleaning unit and the second cleaning unit, wherein the stock section stops carrying the carrying plate for a prescribed time.

In the polishing system, the third carrying unit may include a raising mechanism, which vertically raises the carrying plate, and the second cooling unit may cool the carrying plate, which has been vertically raised, by cooled air flowing downward.

In the polishing system, the seventh carrying unit may include a raising mechanism, which vertically raises the carrying plate, and the second cleaning unit may clean the carrying plate, which has been vertically raised, by sinking in the wash tub.

The polishing system may further comprise:

a checking unit checking an external shape, including flatness, of the carrying plate;

a discharging unit discharging the carrying plate when the checking unit judges the carrying plate a wrong carrying plate; and a supplying unit supplying a correct carrying plate to the loop line instead of the wrong carrying plate.

In the polishing system of the present invention, the units are arranged and connected to form into the loop line, so the carrying plate can be properly circulated in the loop line, and a plurality of the wafers can be automatically polished in the loop line. By automatically polishing the wafers without manual work, the degree of cleanliness of the clean room can be higher. And the wafers can be polished with higher polishing accuracy.

BRIEF DESCRIPTION OF THE DRAWINGS

Embodiments of the present invention will now be described by way of examples and with reference to the accompanying drawings, in which:

FIG. 3 is a plan view of another embodiment of the polishing system of the present invention.

DETAILED DESCRIPTION OF THE INVENTION

Preferred embodiments of the present invention will now be described in detail with reference to the accompanying drawings.

Figure 1:
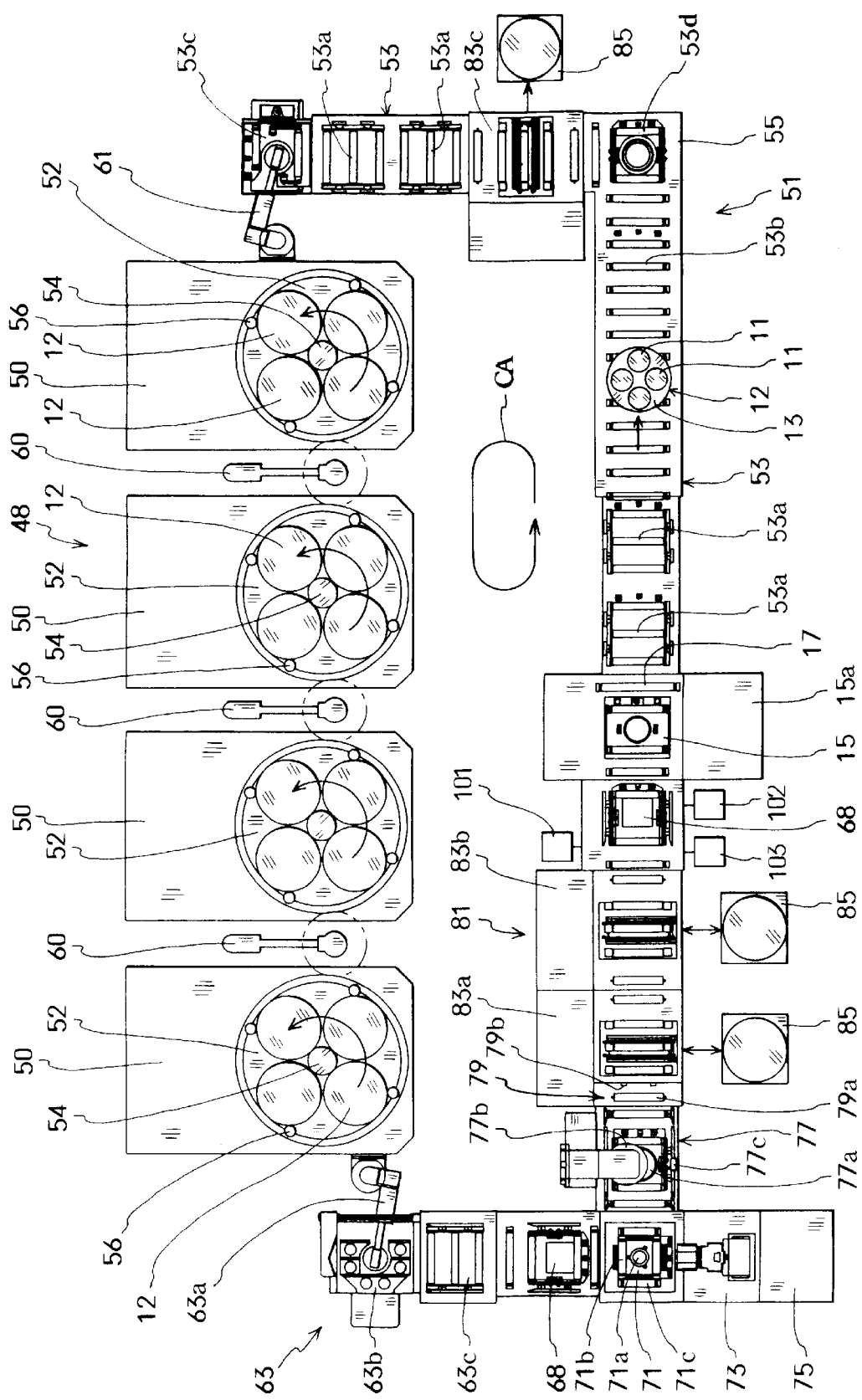
FIG. 1 is a plan view of an embodiment of a polishing system of the present invention.

FIG. 1 is the plan view of an embodiment of a polishing system for polishing silicon wafers, wherein wafers 11 are stuck on carrying plates 12 by water and conveyed or carried.

The carrying plates 12 are formed as circular plates. To properly convey the wafers 11 with the carrying plates 12, the wafers 11 are stuck on surfaces of the carrying plates 12 by liquid, e.g., water. In the present embodiment, four wafers 11, whose diameter is 8 inches, or five wafers 11, whose diameter is 6 inches, are mounted on each carrying plate 12.

An elastic member, which is capable of properly fitting a surface of the wafers 11, is adhered on a substrate of the carrying plate 12 by an adhesive. For example, a porous high polymer sheet, which is mainly made of polyurethane, is used as the elastic member. The elastic member is capable of tightly fitting on the surface of the wafers 11 and sticking thereon by surface tension or viscosity of the liquid (water).

A template 13 is adhered on the elastic member by an adhesive. Thickness of the template 13 is ⅔ of thickness of the wafer 11 The template 13 has a plurality of circular holes into which the wafers 11 are respectively fitted. The wafers 11, which are adhered on the carrying plate 12, are enclosed by the template 13, so that displacement of the wafers 11 on the carrying plate 12 is prevented.

A mounting unit 15 adheres the wafers 11, which are fed by a wafer feeding unit 15a, onto the elastic member of the carrying plate 12.

The wafer feeding unit 15a pulls out the wafer 11 from a wafer cassette, in which a plurality of wafers 11 are accommodated, and sets the wafer 11 into the circular hole of the template 13 of the carrying plate 12. As disclosed in Japanese Patent Kokai Gazette No. 5-318310 "METHOD OF MOUNTING WAFER AND DEVICE FOR THE METHOD", for example, the wafer feeding unit 15a may have an X-Y mechanism (a two dimensional drive mechanism), a rotary table, a vertical driving mechanism, etc. Note that, the wafer feeding unit 15a may have a cleaning unit for cleaning the wafers 11 so as to securely adhere the wafers 11.

The mounting unit 15 has a pressing mechanism for pressing the wafers 11, which have been mounted on the carrying plate 12, with prescribed force so as to properly adhere the wafers 11 on the surface of the carrying plate 12.

In the present embodiment, a roller unit having a roller 17, which is capable of pressing the wafers 11 onto the carrying plate 12 by its own weight and rolling to pass and convey the carrying plate 12. The roller 17 is capable of rotating about a shaft, and the shaft is capable of vertically moving. A cushion member if provided on a circumferential face of the roller 17 to prevent damage to the wafers 11.

Figure 2:
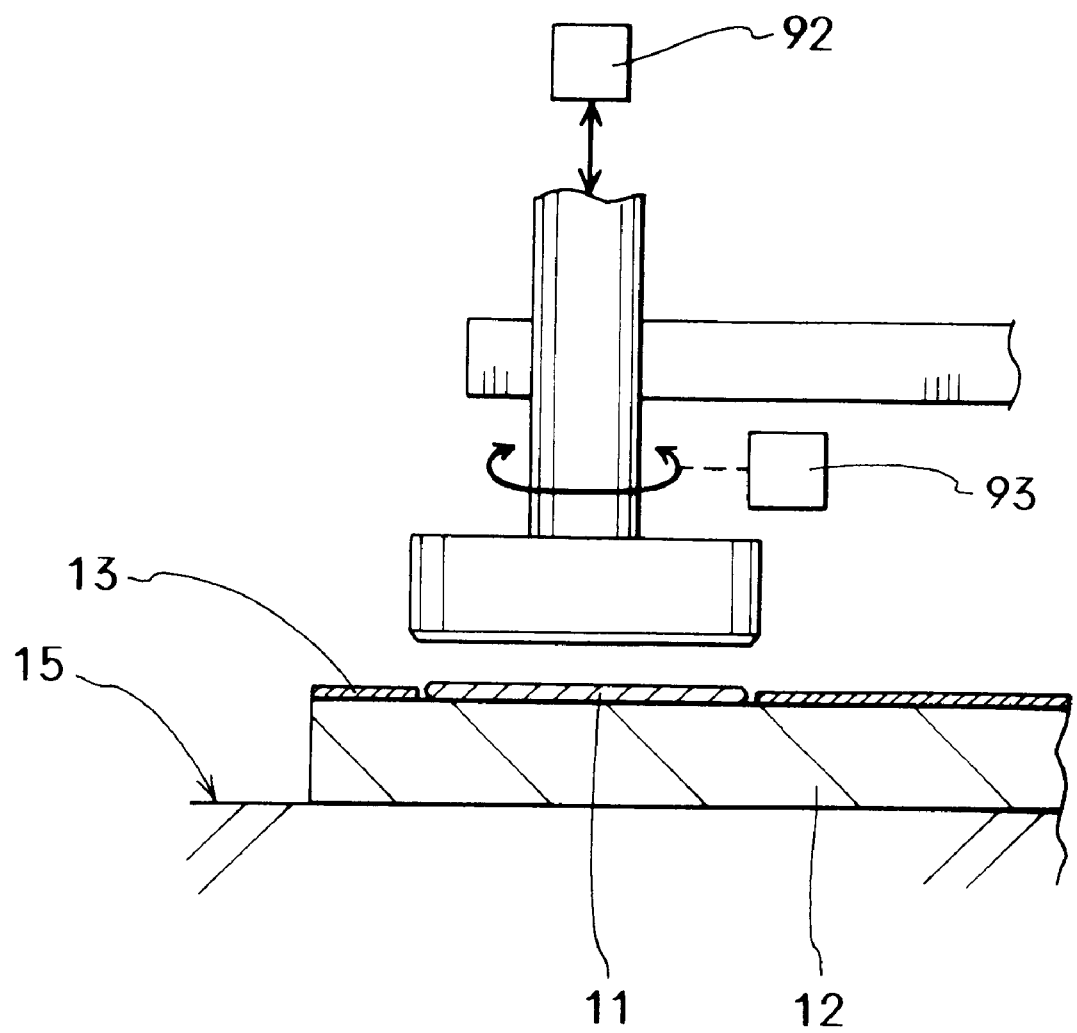
FIG. 2 is a sectional view of an embodiment of a pressing mechanism.

Another example of the pressing mechanism is shown in FIG. 2. The pressing mechanism has pressing means 92 for pressing the wafer 11 onto the carrying plate 12; and rotating means 93 for slightly rotating the pressing means 92 and the wafer 110 For example, an air bag can be employed as the pressing means 92. The air bag uses fluid (air) pressure, so whole surface of the wafer 11 is uniformly pressed.

By pressing the wafer 11 onto the carrying plate 12 (the elastic member) by the pressing mechanism, air bubbles and surplus water between the wafer 11 and the elastic member of the carrying plate 12 is removed. By removing the bubbles and the surplus water, the wafers 11 are be securely and tightly adhered onto the elastic member, which constitutes the surface of the carrying plate 12.

A polishing line 48 includes a plurality of polishing units 50 which are linearly arranged. Each polishing unit 50 has a polishing plate 52 for polishing the wafers 11. The polishing plate 52 is relatively moved with respect to the carrying plate 12 to polish the surfaces of the wafers 11. In the present embodiment, four polishing units 50 are linearly arranged in the polishing line 48.

Next, the polishing unit 50 will be explained.

The polishing plate 52 has a polishing face, on which polishing cloth is adhered. The polishing plate 52 is rotated in the direction of an arrow to polish the wafers 11. A center roller 54 is freely rotatably provided at a center of the polishing plate 52. A plurality of guide rollers 56 are freely rotatably provided, with a fixed separation, in the circumferential direction. Each guide roller 56 is capable of moving between a pinching position, at which the carrying plate 12 holding the wafers 11 on a bottom face is pinched by the center roller 54 and the guide roller 56, and a releasing position, at which the carrying plate 12 is released therefrom.

In the polishing unit 50, firstly the guide roller 56, which locates at the furthest position, in the rotational direction of the polishing plate 52, from a feeding position of the carrying plate 12, is moved to the pinching position. And the carrying plate 12, which has been fed to the feeding position on the polishing plate 52, is moved to the guide roller 56, which has been located at the pinching position, by rotating the polishing plate 52, so that the carrying plate 12 is pinched by the center roller 54 and the guide roller 56. Next, another carrying plate 12 is moved to the guide roller 56 at the second furthest position, by rotating the polishing plate 52, so that the second carrying plate 12 is also pinched by the center roller 54 and the second furthest guide roller 56 as well as the first carrying plate 12. Namely, four carrying plates 12 are respectively pinched by the center roller 54 and each guide roller 56, in order, by said manner.

Then the carrying plates 12, which have been set on the polishing plate 52, are pressed onto the polishing plate 52, and the polishing plate 52 is rotated, so that the wafers 11 are polished. Since the wafers 11 are respectively pinched between the center roller 54 and the guide rollers 56, the carrying plate 12 is rotated about its own axis because rotational speed of a center part of the polishing plate 52 is different from that of an outer edge thereof. By the rotation of the carrying plate 12, the wafers 11 are uniformly polished.

A feeding unit 51 feeds the carrying plates 12, on which the wafers have been stuck, from the sticking unit 15 to the polishing units 50. The feeding unit 51 includes a conveyor 53, a rotary unit 55 and a feeding arm 61.

The conveyor 53 includes conveyor rollers 53a, which are driven by drive units, and conveyor rollers 53b, which are synchronously driven by, for example, belt means. On the conveyor 53, the wafers 11 are stuck on the upper surface of the carrying plates 12.

The number of the carrying plates 12 conveyed by the conveyor 53 may be adjusted by adjusting the length of the conveyor 53, so that polishing cycle time of the polishing system can be adjusted.

The rotary unit 55 has a pair of conveyor rollers 53d and a turning unit for turning the carrying plate 12 in a 90-degrees arc. The conveyor rollers 53d introduce the carrying plate 12 from a sticking unit 15 side, then the turning unit turns the carrying plate 12 90 degrees, and the conveyor rollers 53d send the carrying plate 12 toward the polishing units 50.

The feeding arm 61 feeds the carrying plate 12 onto the feeding position of the first (nearest) polishing unit 50. The feeding arm 61 includes a turning mechanism for turning the carrying plate 12 so as to locate the wafer 11 on the lower side. By the turning mechanism, the feeding arm 61 is capable of conveying the carrying plate 12, in which the wafer 11 is adhered on the bottom face, from a position 53c, which is an end of the conveyor 53, to the feeding position of the polishing plate 52.

A conveying unit 83c discharges the carrying plate 12 outside when a bar code reader 68 judges the carrying plate 12 to be a wrong carrying plate. If the carrying plate 12 is not the wrong carrying plate, the first conveying unit 83c conveys the carrying plate 12 forward.

Transferring units 60 are respectively provided between the adjacent polishing units 50. Each transferring unit 60 transfers the carrying plate 12, which is located at a discharging position of the polishing plate 52 of the polishing unit 50 located on an upstream side, to the feeding position of the polishing plate 52 of the polishing unit 50 located on a downstream side.

When a plate brush (not shown), which is made of a circular plate having the diameter equal to the carrying plate 12 and which has brush hair on a bottom face of the circular plate, is fed onto the polishing plate 52, abrasion dusts which have been filled in the polishing cloth on the polishing plate 52 are removed. The plate brush is pinched between the center roller 54 and the guide roller 56 and pressed onto the polishing cloth by the pressing mechanism. The abrasion dusts are removed by rotating the polishing plate 52. The abrasion dusts may be removed by other means.

A first discharging unit 63 discharges the carrying plate 12 from the last polishing unit 50, which is located at the left end of the polishing line 48 in FIG. 1, and conveys the carrying plate 12, which has been discharged, to a dismounting unit 71. The first discharging unit 63 includes: a discharging arm 63a; a plate stock section 63b; a conveyor 63c; and the bar code reader 68.

The discharging arm 63a is provided in the vicinity of the last polishing unit 50 of the polishing line 48. The discharging arm 63a turns the carrying plate 12 upside down and discharges to the plate stock section 63b.

The plate stock section 63b has a wash tab, in which a plurality of boxes are provided. The number of boxes is equal to the number of the carrying plates 12 on each polishing plate 52. Washing liquid is filled in the wash tub, and the carrying plates 12 with the wafers 11 are sunk therein. By sinking in the washing liquid, the polished surfaces of the wafers 11 are cleaned, and erosion caused by liquid abradant, e.g., slurry, is prevented.

The bar code reader 68 acts as an identifying unit for identifying the carrying plates 12. The carrying plates 12, which have been accommodated in the boxes of the plate stock section 63b, are conveyed to the bar code reader, in order, by the conveyor 63c. The bar code reader 68 reads bar codes provided on bottom faces of the carrying plates 12. For example, the bar code reader 68 identifies sizes of the wafers 11, types of the wafers 11, e.g., a notch type , an orientation flat type, etc. The data read by the bar code reader 68 is used for manufacturing management.

The dismounting unit 71 is provided in the vicinity of the bar code reader 68. The wafers 11, which have been polished, are removed from the carrying plates 12. The wafers 11, which have been removed, are accommodated in a wafer accommodating section 73, which is located beside the peeling unit 71. The dismounting unit 71 includes a rotatable mounting table 71a, which is capable of holding the carrying plate 12 by vacuum pressure, which has been conveyed from the bar code reader 68, in an inclined state. The dismounting unit 71 further has a nozzle, which blows pure water against an outer edge of the wafer 11 to remove the wafer 11 from the carrying plate 12. After removing the wafer 11, the nozzle moves above the carrying plate 12 toward the wafer accommodating section 73 so as to send the wafer 11 to the wafer accommodating section 73 along the inclined mounting table 71a. Therefore, the wafer 11 is removed by rotating the mounting table 71a, on which the carrying plate 12 with the wafer 11 is held in the inclined state, and blowing the pure water, by the nozzle, against the outer edge of the wafer 11. Then the nozzle moves and blows the pure water to send the wafer 11 to the wafer accommodating section 73.

The dismounting unit 71 further has: a pair of conveying rollers 71b for introducing the carrying plate 12 into the dismounting unit 71; and a pair of conveying rollers 71c, which are arranged perpendicular to the conveying rollers 71b so as to send the carrying plate 12 from the dismounting unit 71 to a cleaning unit 77. The conveying rollers 71c act as a second discharging unit.

The wafer accommodating section 73 has a cassette, which is filled with pure water. The wafers 11, which have been removed from the carrying plates 12, are accommodated in the cassette, so the wafers 11 are sunk in the pure water. Upon filling the cassette with the wafers 11, the full filled cassette is discharged by a cassette conveying unit 75, e.g., an arm robot, and a vacant cassette is supplied into the wafer accommodating section 73 by the cassette conveying unit 75.

The cleaning unit 77 cleans surfaces of the carrying plates 12, from which the wafers 11 have been removed by the peeling unit 71. In the cleaning unit 77, a mounting table 77a, on which the carrying plate 12 is mounted, is rotated, and an upper plate 77b, which has a brush, is rotated and linearly moved. By the mounting table 77a and the upper plate 77b, an upper face of the carrying plate 12 is brushed and cleaned. There is provided a brush 77c beside the mounting table 77a. The brush 77c brushes and cleans side faces of the carrying plate 12, which is mounted on the mounting table 77a. A brushing section 79 has a roller brush 79a for brushing a rear face of the carrying plate 12. A line shower unit 79b blows washing liquid against the roller brush 79a to clean the carrying plate 12.

A third discharging unit 81 discharges the carrying plate 12, which has been cleaned, from the cleaning unit 77 and conveys it the mounting unit 15. The third discharging unit 81 includes: a plate conveying unit 83a, which supplies and discharges the carrying plates 12 for holding five wafers 11; a plate conveying unit 83b, which supplies and discharges the carrying plates 12 for holding four wafers 11; and another bar code reader 68.

The bar code reader 68 reads the data of the carrying plates 12, so the carrying plates 12 are selected. Namely, wrong carrying plates 12, which are not used in the next polishing cycle, are selected on the basis of the data. The wrong carrying plates 12 are discharged by the plate conveying unit 83a or 83b. The wrong carrying plates 12, which have been discharged, are transferred onto a conveyor 85 to discharge. The conveyors 85 are used to supply the carrying plates 12, too.

Namely, the plate conveying units 83a and 83b discharge the wrong carrying plates 12 from a closed loop line, which is constituted by above described units, when the bar code reader 68 detects the wrong carrying plates 12; the plate conveying units 83a and 83b supplies additional carrying plates 12 to the loop line.

As described above, another bar code reader 68 is provided between the plate conveying unit 83b and the sticking section 15. The bar code reader 68 has functions as well as the bar code reader in the first discharging unit 63. In the present embodiment, the bar code reader 68 counts a number of time each carrying plate 12 is used so as to detect an end of a life span of the carrying plate 12. By employing the bar code reader, correct carrying plates 12 only and used in the loop line. Note that, the bar code reader 68 can be set at any position in the loop line.

In the loop line for automatically polishing the wafers 11, the units are arranged to form a loop as shown in FIG. 1. The carrying plates 12 are circulated in the loop line in the direction of an arrow CA. By employing the conveyor 53, in which a plurality of carrying plates 12 are kept thereon, the plate stock section 63, in which a plurality of carrying plates 12 are sunk in the washing liquid, e.g., transport of the carrying plates 12 can be stopped, so that the polishing cycle time of the loop line can be optionally adjusted.

In the First Embodiment, the loop line polishing system further has: a checking unit 101, which checks external shapes, including flatness, of the carrying plates 12; a discharging unit 102, which discharges wrong carrying plates 12 when the checking unit 101 judges that the carrying plates 12 checked are out of standard; and a supplying unit 103, which supplies correct carrying plates 12 to the loop line instead of the wrong carrying plates 12. Conveying means such as the plate conveying units 83a, 83b and 83c may be employed as the discharging unit 102 and the supplying unit 103. The wrong carrying plates 12 can be automatically exchanged to the correct carrying plates 12, so the polishing system can be continuously automatically operated.

FIG. 3 is the plan view of the polishing system of another embodiment wherein, elements explained in the first embodiment are assigned the same numeric symbols and explanation thereof is omitted.

In the second embodiment, the wafers 11 are respectively adhered on the carrying plates, by adhesive, to carry the wafers 11.

A heating unit 10 heats the carrying plates 12. Each carrying plate 12 is heated twice by a first heater 10a and a second heater 10b. The carrying plates 12, which have been highly cleaned by a second cleaning unit 82, are supplied to the heating unit 10 by an eighth carrying unit 90.

An adhering unit 14 adheres the wafers 11 onto the carrying plates 12, which have been heated by the heating unit 10, by the adhesive.

In the adhering unit 14, a wafer feeding unit 16 takes out the wafers 11 from cassettes 18, in which the wafers 11 are accommodated, and feeds the wafers 11 to a first centering unit 20, which is located beside the wafer feeding unit 16. The cassettes 18 are arranged to enclose a rotary shaft of a feeding arm 16a, which handles the wafers 11, to efficiently take out and send the wafers 11. Note that, a cleaning unit for cleaning the wafers 11 may be provided between the wafer feeding unit 16 and the first centering unit 20. The cleaning unit may have: a wash tub filled with pure water, in which the wafers 11 are sunk; a hydroextractor; and a dryer.

An adhesive feeder 22 rotates the wafers 11 using a spinner, and feeds the adhesive, e.g., wax, onto adhering surfaces of the wafers 11 by a dispenser. The first centering unit 20, which coincides centers of the carrying plates 12 with a carrying track thereof, is provided immediately before the adhesive feeder 22, so the centers of the wafers 11 can be easily coincided with a shaft of the spinner.

A baking unit 24 heats the adhesive on the wafers 11 to evaporate a solvent thereof.

A second centering unit 26 centers the wafers 11 before the wafer 11 is adhered onto the carrying plate 12.

A position detector 28 detects notches or orientation flats of the wafers 11. By detecting the notches or the orientation flats, the wafers 11 can be correctly positioned on the carrying plates 12.

An adhering table 30 holds the carrying plates 12. The wafers 11 are adhered onto the carrying plates 12, which have been mounted and held on the adhering table 30.

A turning unit 32 turns the wafers 11, on which the adhesive have been applied on an upper face and which has been positioned by the second centering unit 26 and the position detector 28, upside down and adheres the wafers 11 onto the carrying plates 12. The wafers 11 are pressed toward the carrying plates 12, by a pressing mechanism, to tightly adhere.

A first carrying unit 34 carries the carrying plates 12 from the heating unit 10 to the adhering unit 14.

A first cooling unit 36 cools the carrying plates 12, to which the wafers 11 are adhered, until reaching at or lower than softening temperature of the adhesive. The first cooling unit 36 has cooling tables 36a on which the carrying plates 12 are mounted to cool. The cooling tables 36a are cooled by a water circulation system. In the Second Embodiment, the cooling tables 36a are serially arranged, and the carrying plates 12 are intermittently sent to the cooling tables 36a so as to cooled them a plurality of times.

A second carrying unit 38 carries the carrying plates 12, to which the wafers 11 are adhered, from the adhering table 30 to the first cooling unit 36.

A conveying unit 40 is included in the first cooling unit 36. The conveying unit 40 conveys the carrying plates 12, to which the wafers 11 are adhered, to the cooling tables 36a.

A second cooling unit 42 cools the carrying plates 12 with the wafers 11, which have been cooled by the first cooling unit 36, until reaching room temperature. In the second embodiment, the carrying plates 12 are conveyed by a conveyor 44 and cooled by blowing cooled air, so that the second cooling unit 42 can effectively cool the carrying plates 12.

By cooling the carrying plates 12, to which the wafers 11 are adhered, by the first cooling unit 36 and the second cooling unit 42, the cycle time of polishing the wafers 11 is easily adjusted, and the polishing system can be continuously automatically operated.

A third carrying unit 36 carries the carrying plates 12 with the wafers 11 from the first cooling unit 36 to the second cooling unit 42. In and in the vicinity of the heating unit 10, the adhering unit 14, the first cooling unit 36 and the second cooling unit 42, down-flow of clean air prevents dust, which makes the polishing accuracy decrease, from sticking onto the wafers 11 and invading into the adhesive.

In the second embodiment, the carrying plates 12 are horizontally carried in the second cooling unit 42 in a state that the wafers 11 are located on upper sides. However, the carrying plates 12 may be carried in a state of vertically standing, namely the carrying plates 12 may be carried in the state that the surfaces of the carrying plates 12 are arranged perpendicular to the horizontal plane. In this case, the third carrying unit 36 has a raising mechanism for vertically raising the carrying plates 12. Further, if the second cooling unit 42 cools the carrying plates 12 vertically standing by the down-flow of the clean air, they can be effectively cooled without dust or fine particles. By using the stream of the down-flow of the clear air, the dusts and the particles fall down by their own weight without sticking on the wafers 11, and the clean air can be effectively circulated. By cooling the carrying plates 12 in the vertical state, required area in the second cooling unit 42 can be small. Even if the carrying plates 12 are vertically raised, the adhesive has been cooled at or lower than the softening temperature, so wafers 11 do not move on the carrying plates 12.

A polishing line 48 includes four polishing units 50 in the second embodiment. The structure of the polishing units 50 is the same as the first embodiment, so explanation will be omitted.

A feeding unit 58 feeds the carrying plate 12 onto the feeding position of the polishing plate 52 of the first polishing unit 50 (the polishing plate 50 at the right end in FIG. 3). A turning unit 59 turns the carrying plate 12, which has been cooled by the second cooling unit 42, to locate the wafer 11 on the lower side of the carrying plate 12. And the turning unit 59 moves the carrying plate 12 to a position at which the feeding unit 58 holds the carrying plate 12. The feeding unit 58 and the turning unit 59 constitute a fourth carrying unit 57 for carrying the carrying plates 12 from the second cooling unit 42 to the polishing plate 50 (the polishing line 48).

Transferring units 60 are respectively provided between the adjacent polishing plates 50. Each transferring unit 60 transfers the carrying plate 12 which is located at a discharging position of the polishing plate 52 of the polishing unit 50 located on an upstream side to the feeding position of the polishing plate 52 of the polishing unit 50 located on a downstream side.

Note that, abrasion dusts in the polishing cloth of the polishing plates 52 of the polishing units 50 can be removed by the plate brush (not shown) as well as in the first embodiment.

A fifth carrying unit 62 carries the carrying plates 12, to which the wafers 11 are adhered, from the discharging position of the last polishing unit 50 (the polishing unit 50 at left end in FIG. 3) to a dismounting unit 64 in order. Namely, the fifth carrying unit 62 is located beside the last polishing unit 50 in the polishing line 48 and carries the carrying plates 12, which has been turned upside down, to the dismounting unit 64.

The dismounting unit 64 removes the wafers 11, which have been polished, from the carrying plates 120

The dismounting unit 64 has a sinking section 66, in which pure water is filled and in which the boxes for accommodating the carrying plates 12 are accommodated. The carrying plates 12, which have been carried by the fifth carrying unit 62, are sunk in the pure water together with the boxes. The bar code reader 68 reads the bar codes of the carrying plate 12, which is in the sinking section 66. The bar code is provided on the bottom face of each carrying plate 12. In the present embodiment, the bar code reader 68 counts a number of uses of each carrying plate 12 so as to detect an end of life span of the carrying plate 12. By employing the bar code reader 68, the correct carrying plates 12 only can be used. Note that, the bar code reader 68 can be set in any positions in the polishing unit.

A dismounting section 70 is provided adjacent the bar code reader 68. The dismounting section 70 has a mounting table for mounting the carrying plate 12, which has been taken out from the bar code reader 68. The dismounting section 70 has a suction member, which is capable of holding the carrying plate 12 by air suction and rotating.

A wafer accommodating section 72 accommodates the wafers 11, which have been removed from the carrying plates 12 by the dismounting section 70, in cassettes. Upon filling the cassette with the wafers 11, the full filled cassette is discharged by a cassette conveying unit (not shown) and carried to a stock section. At the stock section, the full filled cassette is sunk in the pure water. On the other hand, a vacant cassette is supplied into the wafer accommodating section 72 by the cassette conveying unit.

The cassette conveying unit may have a plurality of cassette holding means, which are linearly arranged and which are capable of reciprocatively moving between the wafer accommodating section 72 and the stock section. In this cassette conveying unit, firstly a vacant cassette is held by the first cassette holding means, and no cassette is held by the last cassette holding means, then the plurality of the cassette holding means are moved until the last cassette holding means, which has no cassette, locates above the wafer accommodating section 72. Next, the last cassette holding means takes out the full filled cassette from the wafer accommodating section 72, then the plurality of the cassette holding means are moved backward until the first cassette holding means locates above the wafer accommodating section 72. The vacant cassette, which has been held by the first cassette holding means, is supplied into the wafer accommodating section 72. Next, the full filled cassette, which is held by the last cassette holding means, is carried to the stock section. By releasing the full filled cassette, the last cassette holding means has no cassette, so the plurality of the cassette holding means completes one cycle of cassette carrying operation. This cycle is repeated to automatically exchange an cassettes. Note that, the arm robot may be employed as the cassette conveying unit as well as in the first embodiment.

In the dismounting unit 64, the sinking section 66, the bar code reader 68, the dismounting section 70 and the wafer accommodating section 72 are linearly arranged. And a sixth carrying unit 74, which carries the carrying plates 12 from which the wafers 11 are removed by the peeling section 70, is provided in the dismounting section 70. The sixth carrying unit 74 discharges the carrying plates 12 from the dismounting section 70 in the direction perpendicular to a line connecting the peeling section 70 and the bar code reader 68.

A first cleaning unit 76 cleans the carrying plates 12, from which the wafers 11 have been removed by the peeling unit 64, to remove the adhesive left on the surfaces of the carrying plates 12. The first cleaning unit 76 has: a rotary cleaning table, on which the carrying plate 12 is mounted; and an upper plate, which has a brush and which is capable of rotating and linearly moving. With this structure, the upper surfaces of the carrying plates 12 are brushed and cleaned. There is provided a brush beside the rotary cleaning table of the first cleaning unit 76. The brush brushes and cleans side faces of the carrying plate 12, which is mounted on the rotary cleaning table. A brushing section 78 has a roller brush for brushing a rear face of the carrying plate 12. A line shower unit 80 blows washing liquid to clean the carrying plate 12.

The sixth carrying unit 74 carries the carrying plates 12 from the dismounting unit 64 to the first cleaning unit 76.

A second cleaning unit 82 highly cleans the carrying plates 12, which have been cleaned by the first cleaning unit 76, using sinking wash tubs 84. The wash tubs are ultrasonic cleaning tubs, ultrasonic rinsing tubs and hot pure water tubs.

A seventh carrying unit 86 carries the carrying plates 12 from the first cleaning unit 76 to the second cleaning unit 82.

In the second embodiment, the seventh carrying unit 86 includes a raising mechanism for vertically raising the carrying plates 12, and the carrying plates 12 are sunk in the wash tubs 84 in the state of vertically standing. By cleaning the carrying plates 12 in the vertically standing state, required area in the second cleaning unit 82 can be small. The down-flow of the clean air streams in the second cleaning unit 82, so the carrying plates 12 are cleaned without dust and particles being deposited thereon.

In the second cleaning unit 82, the carrying plates 12 are conveyed by proper conveying means. The conveying means may have: a plurality of holding sections capable of simultaneously holding a plurality of carrying plates 12, whose a number corresponds to number of the wash tubs 84; a horizontal driving section capable of synchronously reciprocatively moving the holding sections, in the horizontal direction, whereby each holding section is reciprocatively moved between the adjacent wash tubs 84; and a vertical driving section capable of synchronously reciprocatively moving the holding sections, in the vertical direction. For example, a plurality of parallel-link mechanisms can be used for the horizontal driving section and the vertical driving section. With this structure, each carrying plate 12 can be intermittently sent in the second cleaning unit 82.

A stock section 88 is provided between the first cleaning unit 76 and the second cleaning unit 82. The carrying plates 12 are kept in the stock section 88. When trouble is occurred, the carrying plates 12 can be kept there.

The eighth carrying unit 90 carries the carrying plates 12 from the second cleaning unit 82 to the heating unit 10.

In the second embodiment too, the above described units constitute a closed loop line for automatically polishing the wafers 11. In the loop line for automatically polishing the wafers 11, the units are arranged to form a loop as shown in FIG. 3. The carrying plates 12 are circulated in the loop line in the direction of an arrow CB. By employing the first cooling unit 36 and the second cooling unit 42, in which the carrying plates 12 are kept for a desired time, so that the polishing cycle time of the loop line is optionally adjusted.

In the second embodiment too, the loop line polishing system may further have the checking unit 101, the discharging unit 102 and the supplying unit 103 (see FIG. 1) as well as the First Embodiment.

The invention may be embodied in other specific forms without departing the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A polishing system for polishing a wafer, comprising:
   an adhering unit for adhering the wafer on a surface of a carrying plate using a liquid;
   a polishing unit having a polishing plate, said polishing unit disposing the wafer, adhered to the carrying plate, into contact with the polishing plate and effecting relative movement of the carrying plate with respect to the polishing plate to polish a surface of the wafer;
   a feeding unit for discharging the carrying plate, on which the wafer is adhered, from said adhering unit and feeding the carrying plate to said polishing unit;
   a dismounting unit for removing the wafer from the carrying plate after the wafer is polished by the polishing unit;

a first discharging unit for discharging the carrying plate, with the wafer adhered thereto, from said polishing unit and conveying the carrying plate to said dismounting unit;

a cleaning unit for cleaning the carrying plate after the wafer is removed from the carrying plate by said dismounting unit;

a second discharging unit for discharging the carrying plate from said dismounting unit and conveying to said cleaning unit;

a third discharging unit for discharging the carrying plate from said cleaning unit and conveying to said adhering unit;

the adhering unit, the polishing unit, the feeding unit, the dismounting unit, the first discharging unit, the cleaning unit, the second discharging unit, and the third discharging unit being arranged and connected to form a loop line, so that the carrying plate is circulated on in said loop line for polishing a plurality of the wafers;

the carrying plate having carrying plate data recorded thereon, an identifying unit for reading said carrying plate data on the carrying plate and determining whether said carrying plate data corresponds to a predetermined carrying plate data:

a first conveying unit, responsive to the identifying unit for discharging the carrying plate from said loop line when said identifying unit judges that the carrying plate data on the carrying plate does not correspond to said predetermined carrying plate data; and a second conveying unit for feeding another carrying plate to said loop line.

2. The polishing system according to claim 1, wherein said adhering unit includes a pressing mechanism for pressing the wafer onto the surface of the carrying plate so as to adhere the wafer thereon using the liquid.

3. The polishing system according to claim 2, wherein said pressing mechanism is a roller unit having a press roller, which presses the wafer on the surface of the carrying plate and rolls to convey the carrying plate.

4. The polishing system according to claim 2, wherein said pressing mechanism includes:

means for pressing the wafer on the surface of the carrying plate; and means for slightly rotating the wafer, which has been pressed by said pressing means.

5. The polishing system according to claim 1, further comprising:

a checking unit for checking an external shape, including flatness, of the carrying plate and determining whether said external shape corresponds to a predetermined standard;

a discharging unit, responsive to said checking unit, for discharging the carrying plate when said checking unit judges the carrying plate to have an external shave not corresponding to said predetermined standard; and a supplying unit for supplying another carrying plate to said loop line instead of the carrying plate having an external shape not corresponding to said predetermined standard.

6. A polishing system for polishing a wafer, comprising:

a heating unit for heating a carrying plate on which the wafer is to be adhered;

an adhering unit for adhering the wafer on a surface of the carrying plate using an adhesive after the carrying plate is heated by said heating unit;

a first carrying unit for carrying the carrying plate from said heating unit to said adhering unit;

a first cooling unit for cooling the carrying plate with the wafer adhered thereto until the carrying plate reaches reaching a temperature at or lower than a softening temperature of the adhesive;

a second carrying unit for carrying the carrying plate, with the wafer adhered thereto, from said adhering unit to said first cooling unit;

a second cooling unit for cooling the carrying plate, with the wafer adhered thereto, until the carrying plate reaches room temperature;

a third carrying unit for carrying the carrying plate, with the wafer adhered thereto, from said first cooling unit to said second cooling unit after the carrying plate is cooled to the softening temperature by the first cooling unit;

a polishing unit having a polishing plate, said polishing unit disposing the wafer, adhered to the carrying plate, into contact with the polishing plate and effecting relative movement of the carrying plate with respect to the polishing plate to polish a surface of the wafer;

a fourth carrying unit for carrying the carrying plate, with the wafer adhered thereto, from said second cooling unit to said polishing unit after the wafer is cooled to room temperature;

a dismounting unit for removing the wafer from the carrying plate after the wafer is polished by the polishing unit;

a fifth carrying unit for carrying the carrying plate, with the wafer adhered thereto, from said polishing unit to said dismounting unit;

a first cleaning unit for cleaning the carrying plate, from which the wafer is removed by said dismounting unit, so as to remove the adhesive on the carrying plate;

a sixth carrying unit for carrying the carrying plate from said dismounting unit to said first cleaning unit;

a second cleaning unit having a wash tub, said second cleaning unit further cleaning the carrying plate by sinking in the wash tub after the carrying plate is cleaned by the first cleaning unit;

a seventh carrying unit for carrying the carrying plate from said first cleaning unit to said second cleaning unit;

an eighth carrying unit for carrying the carrying plate from said second cleaning unit to said heating unit after the carrying plate is cleaned by the second cleaning unit;

the heating unit, the adhering unit, the first carrying unit, the first cooling unit, the second carrying unit, the second cooling unit, the third carrying unit, the polishing unit, the fourth carrying unit, the dismounting unit, the fifth carrying unit, the first cleaning unit, the sixth carrying unit, the second cleaning unit, the seventh carrying unit, and the eighth carrying unit being arranged and connected to form a loop line, so that the carrying plate is circulated on in said loop line for polishing a plurality of the wafer:

the carrying plate having carrying plate data recorded thereon;

an identifying unit for reading said carrying plate data on the carrying plate and determining whether said carrying plate data corresponds to a predetermined carrying plate data;

a first conveying unit, responsive to the identifying unit, for discharging the carrying plate from said loop line when said identifying unit judges that the carrying plate data on the carrying plate does not correspond to said predetermined carrying plate data; and a second conveying unit for feeding another carrying plate to said loop line.

7. The polishing system according to claim 6, further comprising a stock section being provided between said first cleaning unit and said second cleaning unit wherein the carrying plate is stored for a prescribed time while not being carried.

8. The polishing system according to claim 6, wherein said third carrying unit includes a raising mechanism, which vertically raises the carrying plate to a vertical standing position, and wherein said second cooling unit cools the carrying plate, which has been vertically raised to said vertical standing position, using downward flowing cooled air.

9. The polishing system according to claim 6, wherein said seventh carrying unit includes a raising mechanism, which vertically raises the carrying plate to a vertical standing position, and said second cleaning unit cleans the carrying plate, which has been vertically raised to the vertical standing position, by sinking the carrying plate in the wash tub oriented in the vertical standing position.

10. The polishing system according to claim 6, further comprising:

a checking unit for checking an external shape, including flatness, of the carrying plate and determining whether the external shape corresponds to a predefined standard;

a discharging unit, responsive to the checking unit, for discharging the carrying plate when said checking unit judges the carrying plate has an external shape not corresponding to the predefined standard; and a supplying unit for supplying a carrying plate to said loop line instead of the carrying plate having the external shape mot cooresponding to the predefined standard.

11. A polishing system for polishing wafers, comprising:

a polishing apparatus that polishes the wafers by executing a cycle wherein the wafers are mounted on carrying plates, polished while mounted on the carrying plates and then dismounted from the carrying plates and the cycle is repeated using new wafers that are then mounted on the carrying plates; and the carrying plates having carrying plate data recorded thereon;

an identifying unit for reading said carrying plate data on the carrying plates and determining whether said carrying plate data corresponds to a predetermined carrying plate data;

a conveying mechanism, responsive to the identifying unit, for discharging ones of the carrying plates from said polishing apparatus when said identifying unit determines that the carrying plate data on the ones the carrying plates does not correspond to said predetermined carrying plate data, and for feeding other carrying plates to the polishing apparatus for use a next execution of the cycle.

\* \* \* \* \*